US010229767B2

(12) United States Patent
Kumanan et al.

(10) Patent No.: US 10,229,767 B2
(45) Date of Patent: Mar. 12, 2019

(54) BROADENING OF PERCOLATION SLOPE IN CONDUCTIVE CARBON BLACK COMPOSITIONS WITH AT LEAST ONE NON-CONDUCTIVE POLYMER

(71) Applicant: SABIC Global Technologies B.V., Bergen op Zoom (NL)

(72) Inventors: Anton Kumanan, Tamil (IN); Reema Sinha, Bangalore (IN); Susanta Mitra, Bangalore (IN); Uchiyama Tatsuya, Tochigi-ken (JP)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 1345 days.

(21) Appl. No.: 13/740,092

(22) Filed: Jan. 11, 2013

(65) Prior Publication Data
US 2014/0197367 A1    Jul. 17, 2014

(51) Int. Cl.
H01B 1/04    (2006.01)
C08L 69/00    (2006.01)
H01B 1/24    (2006.01)
C08L 67/02    (2006.01)
C08K 3/04    (2006.01)
C08L 23/06    (2006.01)
C08L 25/12    (2006.01)

(52) U.S. Cl.
CPC .............. H01B 1/04 (2013.01); C08K 3/04 (2013.01); C08L 23/06 (2013.01); C08L 25/12 (2013.01); C08L 67/02 (2013.01); C08L 69/00 (2013.01); H01B 1/24 (2013.01); C08L 2207/068 (2013.01)

(58) Field of Classification Search
CPC ....................................................... H01B 1/24
USPC ......................................................... 252/511
See application file for complete search history.

(56) References Cited

U.S. PATENT DOCUMENTS 3,975,481 A * 8/1976 Baumgaertner ............ 264/126
4,592,861 A * 6/1986 Bekele et al. ............... 252/511
5,373,046 A   12/1994 Okamura et al.
5,484,838 A   1/1996 Helms et al.
7,786,246 B2  8/2010 Jansen
8,158,701 B1 * 4/2012 Gallucci et al. ............ 524/128
2005/0143508 A1 6/2005 Tyagi et al.
(Continued)

FOREIGN PATENT DOCUMENTS

CN    101283027 A    10/2008
CN    101805503 A    8/2010
JP    03091556       4/1991
(Continued)

OTHER PUBLICATIONS

Data Sheet for Vulcan XC500 carbon black, Cabot, 2016.*
(Continued)

Primary Examiner — William D Young
(74) Attorney, Agent, or Firm — Baker Hostetler LLP

(57) ABSTRACT

The present disclosure relates to thermoplastic electrostatic dissipative (ESD) composites. The disclosed compositions comprise a thermoplastic resin phase and a filler composition comprising a conductive carbon black and a non-conductive polymer, dispersed within the thermoplastic resin phase. Also disclosed are methods for the manufacture of the disclosed composites and articles of manufacture comprising same.

7 Claims, 4 Drawing Sheets

SR Data UHMWPE/ENSACO 250G in PC

(56) References Cited

U.S. PATENT DOCUMENTS

2009/0209695 A1* 8/2009 Yu .......................... C08L 67/02
524/451
2010/0078194 A1* 4/2010 Bhatt .................... B82Y 30/00
174/110 SR

FOREIGN PATENT DOCUMENTS

JP         06184332       7/1994
JP      2008274060 A   11/2008

OTHER PUBLICATIONS

International Patent Application No. PCT/IB2014/058227: International Search Report and Written Opinion dated Feb. 17, 2015, 20 pages.

* cited by examiner

US 10,229,767 B2

BROADENING OF PERCOLATION SLOPE IN CONDUCTIVE CARBON BLACK COMPOSITIONS WITH AT LEAST ONE NON-CONDUCTIVE POLYMER

BACKGROUND OF THE INVENTION

Electrostatic dissipative materials are frequently used in sensitive electronic devices to reduce and/or prevent the accumulation of potentially dangerous charges. For example, in the semiconductor and automotive industries, the accumulation of static charge can result in permanent damage to electronic components and can create hazardous conditions.

Conventional electrostatic dissipative materials utilize conductive fillers, such as, for example, conductive carbon black, in a polymeric matrix or a continuous polymer phase to impart conductive properties. To be effective, electrostatic dissipative materials should have a surface resistivity between E6 and E9 ohm/sq. With conventional materials, the percolation curve (surface resistivity vs. filler loading) is steep, as illustrated in FIG. 1, resulting in a narrow range of filler concentration to achieve a desired surface resistivity. As such, small variations in the concentration and/or loading of the conductive filler can result in substantial, and potentially undesirable, changes in the material's electrostatic dissipative properties.

Accordingly, there remains a need for robust electrostatic dissipative materials that can provide desirable properties over a wider range of composition and processing conditions. This and other needs are satisfied by the various aspects of the present disclosure.

SUMMARY OF THE INVENTION

In accordance with the purpose of the invention, as embodied and broadly described herein, the invention provides improved electrostatic dissipative composites. The composites are generally comprised of a thermoplastic polymer matrix or continuous thermoplastic polymer phase and a dispersed filler phase comprised of a filler system or filler composition distributed within the thermoplastic polymer phase. The filler system or filler composition generally comprises a conductive carbon black and a non-conductive polymer.

In one exemplary aspect, the invention relates to an electrostatic dissipative composite, comprising
  a) a continuous thermoplastic polymer phase; and
  b) at least one dispersed filler phase comprised of a filler composition comprising
    i. a conductive carbon black; and
    ii. a non-conductive polymer;
wherein the filler composition is present in a volume percentage loading in the range of from 7.4 to 10.5 relative to a total volume of the composite; and wherein the composite exhibits a surface resistivity in the range of from $10^6$ ohm/sq to $10^9$ ohm/sq.

In another exemplary aspect, the invention relates to an electrostatic dissipative composite, comprising
  a) a crystalline continuous thermoplastic polymer phase; and
  b) at least one dispersed filler phase comprised of a filler composition, comprising
    i. a conductive carbon black; and
    ii. a non-conductive polymer;
wherein the filler composition is present in a volume percentage loading in the range of from 5.0 to 6.0 relative to a total volume of the composite; and wherein the composite exhibits a surface resistivity in the range of from $10^6$ ohm/sq to $10^9$ ohm/sq.

In a further exemplary aspect, the invention relates to an electrostatic dissipative composite, comprising
  a) a continuous thermoplastic polymer phase; and
  b) at least one dispersed filler phase comprised of a filler composition, comprising
    i. a conductive carbon black; and
    ii. a non-conductive polymer;
wherein the composite exhibits a tolerance level in the range of from ±0.37 to ±1.0.

In an even further exemplary aspect, the invention relates to an electrostatic dissipative composite, comprising
  a) a continuous thermoplastic polymer phase comprising at least one polycarbonate; and
  b) at least one dispersed filler phase comprised of a filler composition, comprising
    i. a ENSACO 250G conductive carbon black; and
    ii. at least one non-conductive polymer selected from the group consisting of styrene-acrylonitrile copolymer encapsulated polytetrafluoroethylene and MIPELON XM 221U ultra-high molecular weight polyethylene;
wherein the filler composition is present in a volume percentage loading in the range of from 7.4 to 10.5 relative to a total volume of the composite; wherein the non-conductive polymer is present in an amount in the range of from 15 to 25 weight % relative to the total filler loading; and wherein the composite exhibits a surface resistivity in the range of from $10^6$ ohm/sq to $10^9$ ohm/sq.

In a yet further exemplary aspect, the invention relates to an electrostatic dissipative composite, comprising
  a) a crystalline continuous thermoplastic polymer phase comprising polybutylene terephthalate; and
  b) at least one dispersed filler phase comprised of a filler composition, comprising
    i. ENSACO 250G a conductive carbon black; and
    ii. MIPELON XM 221U ultra-high molecular weight polyethylene;
wherein the filler composition is present in a volume percentage loading in the range of from 5.0 to 6.0 relative to a total volume of the composite; wherein the non-conductive polymer is present in an amount in the range of from 15 to 25 weight % relative to a total filler loading; and wherein the composition exhibits a surface resistivity in the range of from $10^6$ ohm/sq to $10^9$ ohm/sq.

In another exemplary aspect, the invention relates to an electrostatic dissipative composite, comprising
  a) a continuous thermoplastic polymer phase comprising at least one polymer selected from the group consisting of polybutylene terephthalate and polycarbonate; and
  b) at least one dispersed filler phase comprised of a filler composition, comprising
    i. a ENSACO 250G conductive carbon black; and
    ii. at least one non-conductive polymer selected from the group consisting of styrene-acrylonitrile copolymer encapsulated polytetrafluoroethylene and MIPELON XM 221U ultra-high molecular weight polyethylene;
wherein the non-conductive polymer is present in an amount in the range of from 15 to 25 weight % relative to a total filler loading; and wherein the composite exhibits a tolerance level in the range of from ±0.37 to ±1.0.

Also disclosed are methods of manufacturing and articles of manufacture comprising the invention.

In an exemplary aspect, the invention relates to a method for the manufacture of an electrostatic dissipative composite, comprising the steps of:
a) providing a thermoplastic polymer composition;
b) providing a filler composition, comprising
   i. a conductive carbon black; and
   ii. a non-conductive polymer;
c) combining the filler composition and the thermoplastic resin to provide a composite,
wherein the filler composition is present in the provided composite in a volume percentage loading in the range of from 7.4 to 10.5 relative to a total volume of the composite; and wherein the provided composite exhibits a surface resistivity in the range of from $10^6$ ohm/sq to $10^9$ ohm/sq.

In another exemplary aspect, the invention relates to a method for the manufacture of an electrostatic dissipative composite, comprising the steps of:
a) providing a crystalline thermoplastic polymer composition;
b) providing a filler composition, comprising
   i. a conductive carbon black; and
   ii. a non-conductive polymer;
c) combining the filler composition and the thermoplastic polymer composition to provide a composite,
wherein the filler composition is present in the provided composite in a volume percentage loading in the range of from 5.0 to 6.0 relative to a total volume of the composite; and wherein the provided composite exhibits a surface resistivity in the range of from $10^6$ ohm/sq to $10^9$ ohm/sq.

In yet another exemplary aspect, the invention relates to a method for the manufacture of an electrostatic dissipative composite, comprising the steps of:
a) providing a thermoplastic polymer composition;
b) providing a filler composition comprising
   i. a conductive carbon black; and
   ii. a non-conductive polymer;
c) combining the filler composition and the thermoplastic polymer composition to provide a composite;
wherein the provided composite exhibits a tolerance level in the range of from ±0.37 to ±1.0.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Other advantages will be set forth in part in the description which follows or can be learned by practice. The advantages will be realized and attained by means of the elements and combinations particularly pointed in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate exemplary aspects and together with the description, serve to explain the principles of the compositions, methods and systems disclosed herein.

DETAILED DESCRIPTION OF THE INVENTION

Figure 1:
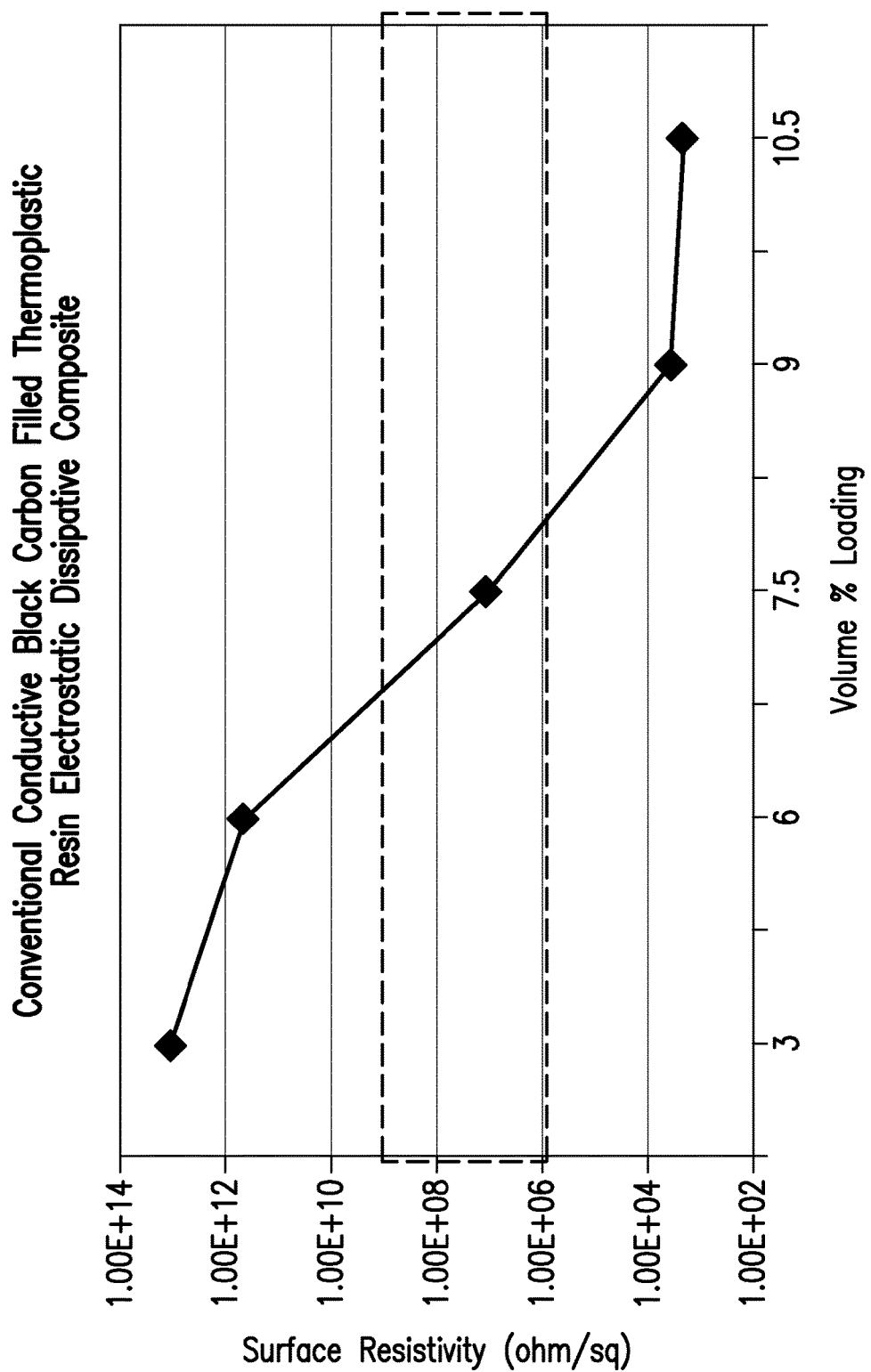
FIG. 1 is a graph illustration of a percolation curve representative of a conventional conductive black carbon filled thermoplastic resin electrostatic dissipative composite.

The present invention can be understood more readily by reference to the following detailed description, examples, drawings, and claims, and their previous and following description. However, before the present compositions, articles, devices, systems, and/or methods are disclosed and described, it is to be understood that this invention is not limited to the specific compositions, articles, devices, systems, and/or methods disclosed unless otherwise specified, as such can, of course, vary. It is also to be understood that the terminology used herein is for the purpose of describing particular aspects only and is not intended to be limiting.

The following description of the invention is also provided as an enabling teaching of the invention in its best, currently known aspect. To this end, those of ordinary skill in the relevant art will recognize and appreciate that changes and modifications can be made to the various aspects of the invention described herein, while still obtaining the beneficial results of the present invention. It will also be apparent that some of the desired benefits of the present invention can be obtained by selecting some of the features of the present invention without utilizing other features. Accordingly, those of ordinary skill in the relevant art will recognize that many modifications and adaptations to the present invention are possible and can even be desirable in certain circumstances and are thus also a part of the present invention. Thus, the following description is provided as illustrative of the principles of the present invention and not in limitation thereof.

Various combinations of elements of this disclosure are encompassed by this invention, e.g. combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate" includes mixtures of two or more such polycarbonates. Furthermore, for example, reference to a filler includes mixtures of two or more such fillers.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" mean that the subsequently described event, condition, component, or circumstance can or cannot occur, and that the description includes instances where said event or circumstance occurs and instances where it does not.

As used herein, the term or phrase "effective," "effective amount," or "conditions effective to" refers to such amount or condition that is capable of performing the function or property for which an effective amount is expressed. As will be pointed out below, the exact amount or particular condition required will vary from one aspect to another, depending on recognized variables such as the materials employed and the processing conditions observed. Thus, it is not always possible to specify an exact "effective amount" or "condition effective to." However, it should be understood that an appropriate effective amount will be readily determined by one of ordinary skill in the art using only routine experimentation.

Disclosed are component materials to be used to prepare disclosed compositions of the invention as well as the compositions themselves to be used within methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article denotes the weight relationship between the element or component and any other elements or components in the composition or article for which a part by weight is expressed. Thus, in a composition containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included. For example if a particular element or component in a composition or article is said to have 8% weight, it is understood that this percentage is relation to a total compositional percentage of 100%.

Compounds disclosed herein are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "alkoxy" as used herein is an alkyl group bound through a single, terminal ether linkage; that is, an "alkoxy" group can be defined as —OR where R is alkyl as defined above. A "lower alkoxy" group is an alkoxy group containing from one to six carbon atoms.

The term "alkenyl group" as used herein is a hydrocarbon group of from 2 to 24 carbon atoms and structural formula containing at least one carbon-carbon double bond. Asymmetric structures such as (AB)C=C(CD) are intended to include both the E and Z isomers. This can be presumed in structural formulae herein wherein an asymmetric alkene is present, or it can be explicitly indicated by the bond symbol C.

The term "alkynyl group" as used herein is a hydrocarbon group of 2 to 24 carbon atoms and a structural formula containing at least one carbon-carbon triple bond.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "cycloalkyl group" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl group" is a cycloalkyl group as defined above where at least one of the carbon atoms of the ring is substituted with a heteroatom such as, but not limited to, nitrogen, oxygen, sulphur, or phosphorus.

The term "aralkyl" as used herein is an aryl group having an alkyl, alkynyl, or alkenyl group as defined above attached to the aromatic group. An example of an aralkyl group is a benzyl group.

The term "hydroxyalkyl group" as used herein is an alkyl, alkenyl, alkynyl, aryl, aralkyl, cycloalkyl, halogenated alkyl, or heterocycloalkyl group described above that has at least one hydrogen atom substituted with a hydroxyl group.

The term "alkoxyalkyl group" is defined as an alkyl, alkenyl, alkynyl, aryl, aralkyl, cycloalkyl, halogenated alkyl, or heterocycloalkyl group described above that has at least one hydrogen atom substituted with an alkoxy group described above.

The term "ester" as used herein is represented by the formula —C(O)OA, where A can be an alkyl, halogenated alkyl, alkenyl, alkynyl, aryl, heteroaryl, cycloalkyl, cycloalkenyl, heterocycloalkyl, or heterocycloalkenyl group described above.

The term "carbonate group" as used herein is represented by the formula —OC(O)OR, where R can be hydrogen, an alkyl, alkenyl, alkynyl, aryl, aralkyl, cycloalkyl, halogenated alkyl, or heterocycloalkyl group described above.

The term "carboxylic acid" as used herein is represented by the formula —C(O)OH.

The term "aldehyde" as used herein is represented by the formula —C(O)H.

The term "keto group" as used herein is represented by the formula —C(O)R, where R is an alkyl, alkenyl, alkynyl, aryl, aralkyl, cycloalkyl, halogenated alkyl, or heterocycloalkyl group described above.

The term "carbonyl group" as used herein is represented by the formula C=O.

The term "ether" as used herein is represented by the formula AOA$^1$, where A and A$^1$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "sulfo-oxo group" as used herein is represented by the formulas —S(O)$_2$R, —OS(O)$_2$R, or, —OS(O)$_2$OR, where R can be hydrogen, an alkyl, alkenyl, alkynyl, aryl, aralkyl, cycloalkyl, halogenated alkyl, or heterocycloalkyl group described above.

As used herein, the terms "number average molecular weight" or "Mn" can be used interchangeably, and refer to the statistical average molecular weight of all the polymer chains in the sample and is defined by the formula:

$$Mn = \frac{\sum N_i M_i}{\sum N_i},$$

where $M_i$ is the molecular weight of a chain and $N_i$ is the number of chains of that molecular weight. Mn can be determined for polymers, such as polycarbonate polymers or polycarbonate-PMMA copolymers, by methods well known to a person having ordinary skill in the art. It is to be understood that as used herein, Mn is measured gel permeation chromatography and as calibrated with polycarbonate standards. For example, gel permeation chromatography can be carried out using a crosslinked styrene-divinyl benzene column, at a sample concentration of 1 milligram per milliliter with appropriate mobile phase solvents.

As used herein, the terms "weight average molecular weight" or "Mw" can be used interchangeably, and are defined by the formula:

$$Mw = \frac{\sum N_i M_i^2}{\sum N_i M_i},$$

where $M_i$ is the molecular weight of a chain and $N_i$ is the number of chains of that molecular weight. Compared to Mn, Mw takes into account the molecular weight of a given chain in determining contributions to the molecular weight average. Thus, the greater the molecular weight of a given chain, the more the chain contributes to the Mw. It is to be understood that as used herein, Mw is measured gel permeation chromatography. In some cases, Mw is measured gel permeation chromatography and calibrated with polycarbonate standards. Gel permeation chromatography can be carried out using a crosslinked styrene-divinyl benzene column, at a sample concentration of about 1 milligram per milliliter with appropriate mobile phase solvents.

As used herein, the terms "polydispersity index" or "PDI" can be used interchangeably, and are defined by the formula:

$$PDI = \frac{Mw}{Mn}.$$

The PDI has a value equal to or greater than 1, but as the polymer chains approach uniform chain length, the PDI approaches unity.

The terms "polycarbonate" or "polycarbonates" as used herein includes copolycarbonates, homopolycarbonates and (co)polyester carbonates.

The terms "residues" and "structural units", used in reference to the constituents of the polymers, are synonymous throughout the specification.

Each of the component materials disclosed herein are either commercially available and/or the methods for the production thereof are known to those of ordinary skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

I. Electrostatic Dissipative Composite

As summarized above, the disclosure provides improved electrostatic dissipative composites. The composites are generally comprised of a thermoplastic polymer matrix or continuous thermoplastic polymer phase and a dispersed filler phase comprised of a filler system or composition distributed within the thermoplastic polymer phase. The filler system or filler composition generally comprises a conductive carbon black and a non-conductive polymer.

In one aspect, the disclosed composites can exhibit a relatively more robust percolation curve when compared to conventional electrostatic dissipative composites. Without wishing to be bound to this theory, it is believed the filler composition comprising conductive carbon black and a non-conductive polymer forms a continuous conductive network at a critical loading, also known as the percolation threshold. In another aspect, the disclosed composition exhibits a relatively flat percolation curve enabling the manufacture of electrostatic dissipative composites with various filler compositions while still maintaining a surface resistivity in the desired range. Thus, in a further aspect, the performance of the disclosed electrostatic dissipative composites will not be significantly affected, if at all, by minor changes or fluctuations in filler composition loading or distribution during processing of the materials.

The disclosed composites can also exhibit, for example, improved mechanical, thermal, and/or morphological properties.

In a further aspect, the disclosed composites exhibit surface resistivity (SR) in a range of from about $10^6$ ohm/sq to about $10^9$ ohm/sq, including exemplary values, $10^7$ ohm/sq and $10^8$ ohm/sq. The surface resistivity can also be within in any range of resistivity values derived from any two of the above stated values. For example, the composition can exhibit a surface resistivity of about $10^7$ ohm/sq to $10^8$ ohm/sq.

A. Thermoplastic Polymer

As summarized above, the disclosed composites comprise one or more thermoplastic polymer resins forming a thermoplastic polymer matrix or continuous thermoplastic polymer phase. The thermoplastic polymer resins include, but are not limited to, polycarbonate, polybutylene terephthalate, polyamide, polycarbonate-polysiloxane copolymer, polyphenylene sulfides, polyacetal, polyetheretherketone and polyimides. In a further aspect, the polyimides used in the disclosed compositions include polyamideimides, polyetherimides and polybenzimidazoles. In a further aspect, polyetherimides can comprise melt processable polyetherimides.

The continuous thermoplastic polymer phase can be present in the disclosed composite in any desired amount as characterized by a weight percentage relative to the total weight of the composites. For example, according to aspects of the disclosure, the thermoplastic polymer phase can be present in an amount in the range of from about 5 weight % up to about 95 weight % relative to the total weight of the composite, including further exemplary amounts of about 10 weight %, 15 weight %, 20 weight %, 25 weight %, 30 weight %, 35 weight %, 40 weight %, 45 weight %, 50 weight %, 55 weight %, 60 weight %, 65 weight %, 70 weight %, 75 weight %, 80 weight %, 85 weight %, 90 weight %. In still further aspects, the thermoplastic polymer phase can be present within any range of amount derived from any two of the above states values. For example, the thermoplastic polymer phase can be present in an amount in the range of from about 5 to about 15 weight %, or in an amount in the range of from about 5 weight % to about 20 weight %, or in an amount in the range of from about 50 weight % to about 85 weight % relative to the total weight of the composite.

In a further aspect, the continuous thermoplastic polymer phase can be present in the composite in any desired amount as characterized by a volume percentage relative to the total volume of the composites. For example, according to aspects of the disclosure, the thermoplastic polymer phase can be present in an amount in the range of from about 5 volume % up to about 95 volume % relative to the total weight of the composite, including further exemplary amounts of about 10 volume %, 15 volume %, 20 volume %, 25 volume %, 30 volume %, 35 volume %, 40 volume %, 45 volume %, 50 volume %, 55 volume %, 60 volume %, 65 volume %, 70 volume %, 75 volume %, 80 volume %, 85 volume %, 90 volume %. In still further aspects, the thermoplastic polymer phase can be present within any range of amount derived from any two of the above states values. For example, the thermoplastic polymer phase can be present in an amount in the range of from about 5 to about 15 volume %, or in an amount in the range of from about 5 volume % to about 20 volume %, or in an amount in the range of from about 50 volume % to about 85 volume % relative to the total volume of the composite.

In another aspect, the thermoplastic polymer matrix or continuous thermoplastic polymer phase can be a crystalline matrix or phase. The crystalline continuous thermoplastic polymer phase can, for example, comprise polybutylene terephthalate (PBT), including for example, polybutylene terephthalate available, for example, from SABIC Innovative Plastics, USA.

In another aspect, the continuous thermoplastic polymer phase comprises at least one polycarbonate polymer. In a further aspect, the continuous thermoplastic polymer phase comprises a polycarbonate copolymer.

The term polycarbonate as used herein is not intended to refer to only a specific polycarbonate or group of polycarbonates, but rather refers to the any one of the class of compounds containing a repeating chain of carbonate groups. In one aspect, a polycarbonate material can include any one or more of those polycarbonate materials disclosed and described in U.S. Pat. No. 7,786,246, which is hereby incorporated by reference in its entirety for the specific purpose of disclosing various polycarbonate compositions and methods for manufacture of same.

In one aspect, a polycarbonate polymer as disclosed herein can be an aliphatic-diol based polycarbonate. In another aspect, the polycarbonate polymer can comprise a carbonate unit derived from a dihydroxy compound, such as, for example, a bisphenol that differs from the aliphatic diol. In still further aspects, an exemplary polycarbonate polymer includes aromatic polycarbonates conventionally manufactured through a transesterification reaction of an one or more aromatic dihydroxy compound(s) and a carbonic acid diester in the presence of one or more catalyst(s).

In one aspect, non-limiting examples of suitable bisphenol compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2- bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxy-3 methylphenyl)cyclohexane 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

In another aspect, exemplary bisphenol compounds can comprise 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl) phthalimidine, 2-phenyl-3,3-bis(4-hydroxyphenyl) phthalimidine ("PPPBP"), and 9,9-bis(4-hydroxyphenyl)fluorene. Combinations comprising at least one dihydroxy aromatic compound can also be used. In another aspect, other types of diols can be present in the polycarbonate.

In a yet another aspect, polycarbonates with branching groups can be useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethylbenzyl) phenol), 4-chloroformyl phthalic anhydride, trimesic acid, and benzophenone tetracarboxylic acid. In one aspect, a branching agent can be added at a level of about 0.05 to about 2.0 wt %. In a still another aspect, mixtures comprising linear polycarbonates and branched polycarbonates can be used.

The polycarbonate polymer can comprise copolymers comprising carbonate units and other types of polymer units, including ester units, and combinations comprising at least one of homopolycarbonates and copolycarbonates. An exemplary polycarbonate copolymer of this type is a polyester carbonate, also known as a polyester-polycarbonate. Such copolymers further contain carbonate units derived from oligomeric ester-containing dihydroxy compounds (also referred to herein as hydroxy end-capped oligomeric acrylate esters). In another aspect, the first polycarbonate component does not comprise a separate polymer such as a polyester. In one aspect, an aliphatic-based polycarbonate comprises aliphatic units that are either aliphatic carbonate units derived from aliphatic diols, or a combination of aliphatic ester units derived from aliphatic diacids having greater than 13 carbons.

In one aspect, the molecular weight of any particular polycarbonate can be determined by, for example, gel permeation chromatography using universal calibration methods based on polystyrene (PS) standards. Generally polycarbonates can have a weight average molecular weight (Mw), of greater than about 5,000 g/mol based on PS standards. In one aspect, the polycarbonates can have an Mw of greater than or equal to about 20,000 g/mol, based on PS standards. In another aspect, the polycarbonates have an Mw based on PS standards of about 20,000 to 100,000 g/mol, including for example 30,000 g/mol, 40,000 g/mol, 50,000 g/mol, 60,000 g/mol, 70,000 g/mol, 80,000 g/mol, or 90,000 g/mol. In still further aspects, the polycarbonates have an Mw based on PS standards of about 22,000 to about 50,000 g/mol. In still further aspects, the polycarbonates have an Mw based on PS standards of about 25,000 to 40,000 g/mol.

Molecular weight (Mw and Mn) as described herein, and polydispersity as calculated therefrom, can be determined using gel permeation chromatography (GPC), using a cross-linked styrene-divinylbenzene column, and either PS or PC standards as specified. GPC samples can be prepared in a solvent such as methylene chloride or chloroform at a concentration of about 1 mg/ml, and can be eluted at a flow rate of about 0.2 to 1.0 ml/min. In one aspect, the glass transition temperature (Tg) of a polycarbonate can be less than or equal to about 160° C., less than or equal to about 150° C., less than or equal to about 145° C., less than or equal to about 140° C., or less than or equal to about 135° C. In a further aspect, the glass transition temperature of a polycarbonate can be from about 85° C. to about 160° C., from about 90° C. to about 160° C., from about 90° C. to about 150° C., or from about 90° C. to about 145° C. In a still further aspect, the glass transition temperature of a polycarbonate can be from about 85° C. to about 130° C., from about 90° C. to about 130° C., from about 90° C. to about 125° C., or from about 90° C. to about 120° C.

In one aspect, disclosed polycarbonate polymer components can be manufactured using an interfacial phase transfer process or melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium such as for example methylene chloride, and contacting the reactants with a carbonate precursor (such as phosgene) in the presence of a catalyst such as, for example, triethylamine or a phase transfer catalyst salt, under controlled pH conditions of, for example, about 8 to about 10.

The polycarbonate can, in various aspects, be prepared by a melt polymerization process. Generally, in the melt polymerization process, polycarbonates are prepared by co-reacting, in a molten state, the dihydroxy reactant(s) and a diaryl carbonate ester, such as diphenyl carbonate, or more specifically in an aspect, an activated carbonate such as bis(methyl salicyl)carbonate, in the presence of a transesterification catalyst. The reaction can be carried out in typical polymerization equipment, such as one or more continuously stirred reactors (CSTRs), plug flow reactors, wire wetting fall polymerizers, free fall polymerizers, wiped film polymerizers, BANBURY® mixers, single or twin screw extruders, or combinations of the foregoing. In one aspect, volatile monohydric phenol can be removed from the molten reactants by distillation and the polymer is isolated as a molten residue. In another aspect, a useful melt process for making polycarbonates utilizes a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl) carboxylate, bis(4-acetylphenyl)carboxylate, or a combination comprising at least one of the foregoing.

The melt polymerization can include a transesterification catalyst comprising a first catalyst, also referred to herein as an alpha catalyst, comprising a metal cation and an anion. In one aspect, the cation is an alkali or alkaline earth metal comprising Li, Na, K, Cs, Rb, Mg, Ca, Ba, Sr, or a combination comprising at least one of the foregoing. The anion is hydroxide ($OH^-$), superoxide ($O_2^-$), thiolate ($HS^-$), sulfide ($S_2^-$), a $C_{1-20}$ alkoxide, a $C_{6-20}$ aryloxide, a $C_{1-20}$ carboxylate, a phosphate including biphosphate, a $C_{1-20}$ phosphonate, a sulfate including bisulfate, sulfites including bisulfites and metabisulfites, a $C_{1-20}$ sulfonate, a carbonate including bicarbonate, or a combination comprising at least one of the foregoing. In another aspect, salts of an organic acid comprising both alkaline earth metal ions and alkali metal ions can also be used. Salts of organic acids useful as catalysts are illustrated by alkali metal and alkaline earth metal salts of formic acid, acetic acid, stearic acid and ethyelenediamine tetraacetic acid. The catalyst can also comprise the salt of a non-volatile inorganic acid. By "nonvolatile", it is meant that the referenced compounds have no appreciable vapor pressure at ambient temperature and pressure. In particular, these compounds are not volatile at temperatures at which melt polymerizations of polycarbonate are typically conducted. The salts of nonvolatile acids are alkali metal salts of phosphites; alkaline earth metal salts of phosphites; alkali metal salts of phosphates; and alkaline earth metal salts of phosphates. Exemplary transesterification catalysts include, lithium hydroxide, sodium hydroxide, potassium hydroxide, cesium hydroxide, magnesium hydroxide, calcium hydroxide, barium hydroxide, lithium formate, sodium formate, potassium formate, cesium formate, lithium acetate, sodium acetate, potassium acetate, lithium carbonate, sodium carbonate, potassium carbonate, lithium methoxide, sodium methoxide, potassium methoxide, lithium ethoxide, sodium ethoxide, potassium ethoxide, lithium phenoxide, sodium phenoxide, potassium phenoxide, sodium sulfate, potassium sulfate, $NaH_2PO_3$, $NaH_2PO_4$, $Na_2H_2PO_3$, $KH_2PO_4$, $CsH_2PO_4$, $Cs_2H_2PO_4$, $Na_2SO_3$, $Na_2S_2O_5$, sodium mesylate, potassium mesylate, sodium tosylate, potassium tosylate, magnesium disodium ethylenediamine tetraacetate (EDTA magnesium disodium salt), or a combination comprising at least one of the foregoing. It will be understood that the foregoing list is exemplary and should not be considered as limited thereto. In one aspect, the transesterification catalyst is an alpha catalyst comprising an alkali or alkaline earth salt. In an exemplary aspect, the transesterification catalyst comprises sodium hydroxide, potassium hydroxide, sodium carbonate, potassium carbonate, sodium methoxide, potassium methoxide, $NaH_2PO_4$, or a combination comprising at least one of the foregoing.

The amount of alpha catalyst can vary widely according to the conditions of the melt polymerization, and can be about 0.001 to about 500 μmol. In an aspect, the amount of alpha catalyst can be about 0.01 to about 20 μmol, specifically about 0.1 to about 10 μmol, more specifically about 0.5 to about 9 μmol, and still more specifically about 1 to about 7 μmol, per mole of aliphatic diol and any other dihydroxy compound present in the melt polymerization. In another aspect, a second transesterification catalyst, also referred to herein as a beta catalyst, can optionally be included in the melt polymerization process, provided that the inclusion of such a second transesterification catalyst does not significantly adversely affect the desirable properties of the polycarbonate. Exemplary transesterification catalysts can further include a combination of a phase transfer catalyst of formula (R3)4Q+X above, wherein each R3 is the same or different, and is a C1-10 alkyl group; Q is a nitrogen or phosphorus atom; and X is a halogen atom or a C1-8 alkoxy group or C6-18 aryloxy group. Exemplary phase transfer catalyst salts include, for example, [CH3(CH2)3]4NX, [CH3(CH2)3]4PX, [CH3(CH2)5]4NX, [CH3(CH2)6]4NX, [CH3(CH2)4]4NX, CH3[CH3(CH2)3]3NX, and CH3[CH3(CH2)2]3NX, wherein X is Cl—, Br—, a C1-8 alkoxy group or a C6-18 aryloxy group. Examples of such transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. Other melt transesterification catalysts include alkaline earth metal salts or alkali metal salts. In various aspects, where a beta catalyst is desired, the beta catalyst can be present in a molar ratio, relative to the alpha catalyst, of less than or equal to 10, specifically less than or equal to 5, more specifically less than or equal to 1, and still more specifically less than or equal to 0.5. In other aspects, the melt polymerization reaction disclosed herein uses only an alpha catalyst as described hereinabove, and is substantially free of any beta catalyst. As defined herein, "substantially free of" can mean where the beta catalyst has been excluded from the melt polymerization reaction. In one aspect, the beta catalyst is present in an amount of less than about 10 ppm, specifically less than 1 ppm, more specifically less than about 0.1 ppm, more specifically less than or equal to about 0.01 ppm, and more specifically less than or equal to about 0.001 ppm, based on the total weight of all components used in the melt polymerization reaction.

In one aspect, a melt process employing an activated carbonate is utilized. As used herein, the term "activated carbonate", is defined as a diarylcarbonate that is more reactive than diphenylcarbonate in transesterification reactions. Specific non-limiting examples of activated carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl) carbonate, bis(o-formylphenyl)carbonate. Examples of specific ester-substituted diarylcarbonates include, but are not limited to, bis(methylsalicyl)carbonate (CAS Registry No. 82091-12-1) (also known as BMSC or bis(o-methoxycarbonylphenyl)carbonate), bis(ethylsalicyl)carbonate, bis(propylsalicyl)carbonate, bis(butylsalicyl)carbonate, bis(benzylsalicyl)carbonate, bis(methyl-4-chlorosalicyl)carbonate and the like. In one aspect, bis(methylsalicyl)carbonate is used as the activated carbonate in melt polycarbonate synthesis due to its lower molecular weight and higher vapor pressure. Some non-limiting examples of non-activating groups which, when present in an ortho position, would not be expected to result in activated carbonates are alkyl, cycloalkyl or cyano groups. Some specific and non-limiting examples of non-activated carbonates are bis(o-methylphenyl)carbonate, bis(p-cumylphenyl)carbonate, bis(p-(1,1,3,3-tetramethyl)butylphenyl)carbonate and bis(o-cyanophenyl)carbonate. Unsymmetrical combinations of these structures can also be used as non-activated carbonates.

In one aspect, an end-capping agent (also referred to as a chain-stopper) can optionally be used to limit molecular weight growth rate, and so control molecular weight in the polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and C1-C22 alkyl-substituted phenols such as p-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be specifically mentioned. Certain monophenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

In another aspect, end groups can be derived from the carbonyl source (i.e., the diaryl carbonate), from selection of monomer ratios, incomplete polymerization, chain scission, and the like, as well as any added end-capping groups, and can include derivatizable functional groups such as hydroxy groups, carboxylic acid groups, or the like. In one aspect, the end group of a polycarbonate can comprise a structural unit derived from a diaryl carbonate, where the structural unit can be an end group. In a further aspect, the end group is derived from an activated carbonate. Such end groups can be derived from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester end groups. In another aspect, the ester end group derived from a salicylic ester can be a residue of BMSC or other substituted or unsubstituted bis(alkyl salicyl)carbonate such as bis(ethyl salicyl)carbonate, bis(propyl salicyl)carbonate, bis(phenyl salicyl)carbonate, bis(benzyl salicyl)carbonate, or the like. In one aspect, where a combination of alpha and beta catalysts are used in the melt polymerization, a polycarbonate polymer prepared from an activated carbonate can comprise end groups in an amount of less than 2,000 ppm, less than 1,500 ppm, or less than 1,000 ppm, based on the weight of the polycarbonate. In another aspect, where only an alpha catalyst is used in the melt polymerization, a polycarbonate polymer prepared from an activated carbonate can comprise end groups in an amount of less than or equal to 500 ppm, less than or equal to 400 ppm, less than or equal to 300 ppm, or less than or equal to 200 ppm, based on the weight of the polycarbonate.

In one aspect, the reactants for the polymerization reaction using an activated aromatic carbonate can be charged into a reactor either in the solid form or in the molten form. Initial charging of reactants into a reactor and subsequent mixing of these materials under reactive conditions for polymerization can be conducted in an inert gas atmosphere such as a nitrogen atmosphere. The charging of one or more reactants can also be done at a later stage of the polymerization reaction. Mixing of the reaction mixture is accomplished by any methods known in the art, such as by stirring. Reactive conditions include time, temperature, pressure and other factors that affect polymerization of the reactants. Typically the activated aromatic carbonate is added at a mole ratio of 0.8 to 1.3, and more preferably 0.9 to 1.3, and all subranges there between, relative to the total moles of monomer unit compounds (i.e., aromatic dihydroxy compound, and aliphatic diacid or diol). In a specific aspect, the molar ratio of activated aromatic carbonate to monomer unit compounds is 1.013 to 1.29, specifically 1.015 to 1.028. In another specific aspect, the activated aromatic carbonate is BMSC.

In one aspect, the melt polymerization reaction can be conducted by subjecting the reaction mixture to a series of temperature-pressure-time protocols. In some aspects, this involves gradually raising the reaction temperature in stages while gradually lowering the pressure in stages. In one aspect, the pressure is reduced from about atmospheric pressure at the start of the reaction to about 1 millibar (100 Pa) or lower, or in another aspect to 0.1 millibar (10 Pa) or lower in several steps as the reaction approaches completion. The temperature can be varied in a stepwise fashion beginning at a temperature of about the melting temperature of the reaction mixture and subsequently increased to final temperature. In one aspect, the reaction mixture is heated from room temperature to about 150° C. In such an aspect, the polymerization reaction starts at a temperature of about 150° C. to about 220° C. In another aspect, the polymerization temperature can be up to about 220° C. In other aspects, the polymerization reaction can then be increased to about 250° C. and then optionally further increased to a temperature of about 320° C., and all subranges there between. In one aspect, the total reaction time can be from about 30 minutes to about 200 minutes and all subranges there between. This procedure will generally ensure that the reactants react to give polycarbonates with the desired molecular weight, glass transition temperature and physical properties. The reaction proceeds to build the polycarbonate chain with production of ester-substituted alcohol by-product such as methyl salicylate. In one aspect, efficient removal of the by-product can be achieved by different techniques such as reducing the pressure. Generally the pressure starts relatively high in the beginning of the reaction and is lowered progressively throughout the reaction and temperature is raised throughout the reaction.

In one aspect, the progress of the reaction can be monitored by measuring the melt viscosity or the weight average molecular weight of the reaction mixture using techniques known in the art such as gel permeation chromatography. These properties can be measured by taking discrete samples or can be measured on-line. After the desired melt viscosity and/or molecular weight is reached, the final polycarbonate product can be isolated from the reactor in a solid or molten form. It will be appreciated by a person skilled in the art, that the method of making aliphatic homopolycarbonate and aliphatic-aromatic copolycarbonates as described in the preceding sections can be made in a batch or a continuous process and the process disclosed herein is preferably carried out in a solvent free mode. Reactors chosen should ideally be self-cleaning and should minimize any "hot spots." However, vented extruders similar to those that are commercially available can be used.

In one aspect, the aliphatic homopolycarbonate and aliphatic-aromatic copolycarbonate can be prepared in an extruder in presence of one or more catalysts, wherein the carbonating agent is an activated aromatic carbonate. In one aspect, the reactants for the polymerization reaction can be fed to the extruder in powder or molten form. In another aspect, the reactants are dry blended prior to addition to the extruder. The extruder can be equipped with pressure reducing devices (e.g., vents), which serve to remove the activated phenol by-product and thus drive the polymerization reaction toward completion. The molecular weight of the polycarbonate product can, in various aspects, be manipulated by controlling, among other factors, the feed rate of the reactants, the type of extruder, the extruder screw design and configuration, the residence time in the extruder, the reaction temperature and the pressure reducing techniques present on the extruder. The molecular weight of the polycarbonate product can also depend upon the structures of the reactants, such as, activated aromatic carbonate, aliphatic diol, dihydroxy aromatic compound, and the catalyst employed. Many different screw designs and extruder configurations are commercially available that use single screws, double screws, vents, back flight and forward flight zones, seals, and sidestreams. One skilled in the art can find the best designs using generally known principals of commercial extruder design. Controlling the ratio diarylcarbonate/diol, specifically BMSC/diol can impact the Mw when using an activated carbonate. A lower ratio can generally give a higher molecular weight.

In an exemplary aspect, the polycarbonate polymer comprises a bisphenol A polycarbonate polymer. In another exemplary aspect, the polycarbonate comprises a blend of at least two different grade bisphenol A polycarbonates. To that end, a polycarbonate grade can, for example, be characterized by the melt volume rate (MVR) of the polycarbonate. For example, a disclosed polycarbonate, such as a bisphenol A polycarbonate, can be characterized by exhibiting a melt Volume Rate (MVR) in the range of from 4 g/10 min to 30 g/10 min at 300° C./1.2 kg. For example, the MVR can range from 10 g/10 min to 25 g/10 min, including for example a MVR in the range of from 15 g/10 min to 20 g/10 min. Further, for example, the MVR can be in the range of from 4 g/10 min or 30 g/10 min.

In these aspects, the continuous thermoplastic polymer phase can comprise at least one polycarbonate. The at least one polycarbonate can, for example, be chosen from polycarbonate 105 and polycarbonate 175, which can, for example, be purchased from SABIC Innovative Plastics, USA.

In aspects where the polycarbonate comprises a blend of two or more polycarbonate polymers, it should be understood that each respect polycarbonate polymer present within the polycarbonate component can be present in any desired amount relative to the total weight percentage of the polycarbonate polymer. For example, in an aspect wherein the polycarbonate polymer comprises at least a first and a second polycarbonate polymer, the first polycarbonate polymer can be present in an amount in the range of from greater than 0 weight % to less than 100 weight % relative to the total weight of the polycarbonate polymer. Similarly, the second polycarbonate polymer can also be present in an amount in the range of from greater than 0 weight % to less than 100 weight % relative to the total weight of the polycarbonate polymer.

B. Filler Composition

The filler composition suitable for the disclosed composite comprises conductive carbon black and a non-conductive polymer.

In one aspect, the filler composition can be present in a volume percentage loading in the range of from 7.4% to 10.5%, based on the total composite volume, including exemplary values, 7.5%, 7.5%, 7.6%, 7.7%, 8.0%, 8.5%, 9.0%, 9.5%, and 10.0%. In still further aspects, the volume percentage loading can be in a range derived from any two of the above listed exemplary volume percentage loading values. For example, the filler composition can be present in a volume percentage loading in the range of from 7.5% to 10.5%, based on the total composite volume.

A crystalline continuous thermoplastic polymer phase can require less volume percentage loading of filler composition when compared to other continuous thermoplastic polymer phases, for example, when compared to an amorphous continuous thermoplastic polymer phase. Without wishing to be bound by theory, it is believed that in the crystalline composition, the conductive carbon particles are ejected out of the crystalline phase and are present mainly on the crystalline boundaries. Since the electrons move from one conductive carbon particle to another, with the non-conductive polymer acting as an electrical insulator, the higher the resin's crystalline structure, the lower the required volume of conductive carbon particles to complete the conductive array.

In one aspect, when the continuous thermoplastic polymer phase is a crystalline continuous thermoplastic polymer phase, the filler compositions can be present in the composition in a volume percentage loading in the range of from 4.5% to 6.5%, based on the total composite volume, including exemplary values, 5.0%, 5.5%, and 6.0%. In still further aspects, the volume percentage loading can be in a range derived from any two of the above listed exemplary volume percentage loading values. For example, the filler composition can be present a volume percentage loading in the range of from 5.0% to 6.0%, based on the total composite volume.

a. Conductive Carbon Black

The filler composition comprises conductive carbon black.

In one aspect, carbon black is an amorphous form of carbon with a high surface-area-to-volume ratio. Further, carbon black has a chemisorbed oxygen complex (i.e., carboxylic, quinonic, lactonic, phenolic groups and the like) on its surface to varying degrees, depending on the conditions of manufacture. Carbon black properties such as particle size, structure, and purity can vary depending on the type of carbon black chosen. In one aspect, carbon black can disperse well within the polymer phase, maintain the integrity of its structure or network, and have a consistent particle size.

The conductivity of the carbon black can be measured using the surface resistivity (SR) of the conductive film. In one aspect, the conductivity can depend upon the polymer phase, the type of conductive carbon black, the loading of the conductive carbon black, and the dispersion of the conductive carbon black.

A non-limiting example of commercially available conductive carbon black includes ENSACO™ 250G, commercially available from the TIMCAL Corporation, USA.

In one aspect, the conductive carbon black is present in an amount ranging from 60 to 90 weight percentage relative to the total filler loading, including exemplary values, 65, 70, 75, and 85. In still further aspect, the weight percentage can be in a range derived from any two of the above listed exemplary weight percentage values. For example the conductive carbon black is present in an amount ranging from 75 to 85 weight percentage relative to the total filler loading.

In one aspect, the carbon black is present in the composition as a agglomerate in a size ranging from 50 to 400 nm, including exemplary values, 100 nm, 150 nm, 200 nm, 250 nm, 300 nm, and 350 nm. In still further aspects, the agglomerate size can be in a range derived from any two of the above listed exemplary agglomerate size values. For example, the carbon black can be present in the composition as agglomerates in a size ranging from 100 nm to 300 nm b. Non-Conductive Polymer The filler composition comprises a non-conductive polymer.

The non-conductive polymer comprises any polymer that does not conduct electricity. The non-conductive polymer includes a polymer based on an alkyl chain monomer. As such, a non-conductive polymer comprises a polymer synthesized from a monomer of methyl, ethyl, propyl, butyl, pentyl, hexyl, and the like. Further, the non-conductive polymer can comprise a copolymer from two or more different alkyl monomers. In another aspect, the non-conductive polymer can be a straight chain, branched, or cross linked polymer.

In one aspect, the non-conductive polymer comprises polyethylene. In a further aspect, the non-conductive polymer comprises high molecular weight or ultra-high molecular weight. In a yet further aspect, the non-conductive polymer can comprise various grades of polyethylene. The different grades can reflect differences between the polymers based on processing parameters, such as temperature, time, molecular weight, or pressure. The different grades can also reflect differences in cross linking.

In one aspect, the UHMWPE has a molecular weight in an amount ranging from 2 to 6 million, including exemplary values of 3 million, 4 million, and 5 million. In still further aspects, the molecular weight can be in a range derived from any two of the above listed exemplary molecular weight. For example, the non-conductive polymer can have a molecular weight in an amount ranging from 2 million to 5 million.

Non-limiting examples of commercially available UHMWPE include MIPELON™ XM 221U, commercially available from Mitsui Chemicals, Japan; GUR™ 2126, commercially available from Ticona Corporation, USA; and SABIC™ 3548, commercially available from SABIC, KSA. The average particle size (from Malvern Mastersizer 2000 particle size analyzer) for MIPELON™ XM 221U, GUR™ 2126, and SABIC™ 3548 are 33 µm, 33 µm, and 158 µm, respectively.

In a further aspect, the non-conductive polymer can comprise a copolymer of a conductive monomer, as long as the final polymer does not conduct electricity. In one aspect, the non-conductive polymer can comprise an acrylonitrile and an aromatic group. In a another aspect, the aromatic group can comprise styrene. In an even further aspect, the non-conductive polymer can comprise a styrene-acrylonitrile copolymer.

In at least one aspect, the styrene-acrylonitrile copolymer can be encapsulated in polytetrafluoroethylene. Non-limiting example of commercially available styrene-acrylonitrile copolymer encapsulated in polytetrafluoroethylene includes TSAN, available from SABIC's Innovative Plastics, USA.

In one aspect, the non-conductive polymer has a particle size in an amount ranging from 15 µm to 175 µm, including exemplary values, 20 µm, 25 µm, 30 µm, 33 µm, 35 µm, 40 µm, 45 µm, 50 µm, 55 µm, 60 µm, 65 µm, 70 µm, 75 µm, 80 µm, 85 µm, 90 µm, 95 µm, 100 µm, 105 µm, 110 µm, 115 µm, 120 µm, 125 µm, 130 µm, 135 µm, 140 µm, 145 µm, 150 µm, 155 µm, 158 µm, 160 µm, 165 µm, and 170 µm. In still further aspects, the particle size can be in a range derived from any two of the above listed exemplary particle size. For example, the non-conductive polymer can have a particle size in an amount ranging from 30 µm to 160 µm.

In one aspect, the non-conductive polymer is present in an amount ranging from 10 to 40 weight percentage relative to the total filler loading, including exemplary values, 15, 20, 25, 30, and 35. In still further aspect, the weight percentage can be in a range derived from any two of the above listed exemplary weight percentage values. For example, the non-conductive polymer is present in an amount ranging from 15 to 25 weight percentage relative to the total filler loading.

c. Optional Additives

The disclosed compositions can further optionally comprise one or more additives conventionally used in the manufacture of polymer resin containing electrostatic dissipative composites with the proviso that the additives do not adversely affect the desired properties of the resulting electrostatic dissipative composite. Mixtures of additives can also be used. Such additives can be mixed at a suitable time during the mixing of the components for forming the composition mixture. For example, the disclosed compositions can comprise one or more fillers, stabilizers, flame-retardants, impact modifiers, colorant, and/or mold release agents.

Exemplary heat stabilizers include, for example, organo phosphites such as triphenyl phosphite, tris-(2,6-dimethylphenyl)phosphite, tris-(mixed mono- and di-nonylphenyl) phosphite or the like; phosphonates such as dimethylbenzene phosphonate or the like, phosphates such as trimethyl phosphate, or the like, or combinations including at least one of the foregoing heat stabilizers. Heat stabilizers are generally used in amounts of from 0.01 to 0.5 parts by weight based on 100 parts by weight of the total composition, excluding any filler.

Exemplary antioxidants include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidenebisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations including at least one of the foregoing antioxidants. Antioxidants are generally used in amounts of from 0.01 to 0.5 parts by weight, based on 100 parts by weight of the total composition, excluding any filler.

The disclosed composites can further comprise an optional filler, such as, for example, an inorganic filler or reinforcing agent. The specific composition of a filler, if present, can vary, provided that the filler is chemically compatible with the remaining components of the composite. In one aspect, the composite comprises a mineral filler. In another aspect, the composite comprises a filler comprising talc. If present, the amount of filler can comprise any amount suitable for the composite that does not adversely affect the desired properties thereof.

In another aspect, an exemplary filler can comprise silicates and silica powders, such as aluminum silicate (mullite), synthetic calcium silicate, zirconium silicate, fused silica, crystalline silica graphite, natural silica sand, or the like; boron powders, such as boron-nitride powder, boron-silicate powders, or the like; oxides, such as $TiO_2$, aluminum oxide, magnesium oxide, or the like; calcium sulfate (as its anhydride, dihydrate or trihydrate), or the like; talc, including fibrous, modular, needle shaped, lamellar talc, or the like; wollastonite; surface-treated wollastonite; glass spheres such as hollow and solid glass spheres, silicate spheres, aluminosilicate, or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers), carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), aromatic polyamides, aromatic polyimides, polyetherimides, polytetrafluoroethylene, or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

Exemplary light stabilizers include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone or the like or combinations including at least one of the foregoing light stabilizers. Light stabilizers are generally used in amounts of from 0.1 to 1.0 parts by weight, based on 100 parts by weight of the total composition, excluding any filler.

Exemplary plasticizers include, for example, phthalic acid esters such as dioctyl-4,5-epoxy-hexahydrophthalate, tris-(octoxycarbonylethyl) isocyanurate, tristearin, epoxidized soybean oil or the like, or combinations including at least one of the foregoing plasticizers. Plasticizers are generally used in amounts of from 0.5 to 3.0 parts by weight, based on 100 parts by weight of the total composition, excluding any filler.

Exemplary antistatic agents include, for example, glycerol monostearate, sodium stearyl sulfonate, sodium dodecylbenzenesulfonate or the like, or combinations of the foregoing antistatic agents. In one aspect, carbon fibers, carbon nanofibers, carbon nanotubes, carbon black, or any combination of the foregoing can be used in a polymeric resin containing chemical antistatic agents to render the composition electrostatically dissipative.

Exemplary mold releasing agents include for example, metal stearate, stearyl stearate, pentaerythritol tetrastearate, beeswax, montan wax, paraffin wax, or the like, or combinations including at least one of the foregoing mold release agents. Mold releasing agents are generally used in amounts of from 0.1 to 1.0 parts by weight, based on 100 parts by weight of the total composition, excluding any filler.

Exemplary UV absorbers include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than 100 nanometers; or the like, or combinations including at least one of the foregoing UV absorbers. UV absorbers are generally used in amounts of from 0.01 to 3.0 parts by weight, based on 100 parts by weight of the total composition, excluding any filler.

Exemplary lubricants include for example, fatty acid esters such as alkyl stearyl esters, e.g., methyl stearate or the like; mixtures of methyl stearate and hydrophilic and hydrophobic surfactants including polyethylene glycol polymers, polypropylene glycol polymers, and copolymers thereof e.g., methyl stearate and polyethylene-polypropylene glycol copolymers in a suitable solvent; or combinations including at least one of the foregoing lubricants. Lubricants are generally used in amounts of from 0.1 to 5 parts by weight, based on 100 parts by weight of the total composition, excluding any filler.

Exemplary blowing agents include for example, low boiling halohydrocarbons and those that generate carbon dioxide; blowing agents that are solid at room temperature and when heated to temperatures higher than their decomposition temperature, generate gases such as nitrogen, carbon dioxide, ammonia gas, such as azodicarbonamide, metal salts of azodicarbonamide, 4,4' oxybis(benzenesulfonylhydrazide), sodium bicarbonate, ammonium carbonate, or the like, or combinations including at least one of the foregoing blowing agents. Blowing agents are generally used in amounts of from 1 to 20 parts by weight, based on 100 parts by weight of the total composition, excluding any filler.

As noted above, the disclosed composites can optionally further comprises a flame retardant additive. In various aspects, the flame retardant additive can comprise any flame retardant material or mixture of flame retardant materials suitable for use in the inventive composites. In another aspect, the flame retardant additive comprises a phosphate containing material. In another aspect, the flame retardant additive comprises a halogen containing material. In other aspects, the flame retardant additive is free of or substantially free of one or more of phosphate and/or a halogen. In still another aspect, the flame retardant additive comprises an oligomer organophosphorous flame retardant, including for example, bisphenol A diphenyl phosphate (BPADP). In a further aspect, the flame retardant is selected from oligomeric phosphate, polymeric phosphate, oligomeric phosphonate, or mixed phosphate/phosphonate ester flame retardant compositions. In a still further aspect, the flame retardant is selected from triphenyl phosphate; cresyldiphenylphosphate; tri(isopropylphenyl)phosphate; resorcinol bis(diphenylphosphate); and bisphenol-A bis(diphenyl phosphate). In a yet further aspect, the flame retardant is bisphenol-A bis(diphenyl phosphate).

The concentration of a flame retardant additive can vary, and the present invention is not intended to be limited to any particular flame retardant concentration. In one aspect, the disclosed composition can comprises from greater than 0% to about 20 wt % of flame retardant additive, including or example, about 1, 2, 3, 4, 5, 6, 7, 8, 9, 10, 11, 12, 13, 14, 15, 16, 17, 18, or 19 weight %. In still further aspects, the flame retardant additive can be present in any range of amounts derived from the above values. For example, the flame retardant additive can be present in the polycarbonate composition in an amount in the range of from about 5 weight % to about 15 weight %, or event from about 10 weight percent to about 20 weight %. Flame retardant additives are commercially available, and one of skill in the art could readily select an appropriate flame retardant additive.

Additionally, materials to improve flow and other properties can be added to the composition, such as low molecular weight hydrocarbon resins. Particularly useful classes of low molecular weight hydrocarbon resins are those derived from petroleum $C_5$ to $C_9$ feedstock that are derived from unsaturated $C_5$ to $C_9$ monomers obtained from petroleum cracking. Non-limiting examples include olefins, e.g. pentenes, hexenes, heptenes and the like; diolefins, e.g. pentadienes, hexadienes and the like; cyclic olefins and diolefins, e.g. cyclopentene, cyclopentadiene, cyclohexene, cyclohexadiene, methyl cyclopentadiene and the like; cyclic diolefin dienes, e.g., dicyclopentadiene, methylcyclopentadiene dimer and the like; and aromatic hydrocarbons, e.g. vinyltoluenes, indenes, methylindenes and the like. The resins can additionally be partially or fully hydrogenated.

C. Electrostatic Dissipative Composite Properties

As one of ordinary skill in the art will appreciate, the electrical conductivity of a composition is generally characterized by its dependence on filler volume fraction. Without wishing to be bound by theory, it is believed that as the filler amount in the composition is increased, the filler particles begin to contact each other and a continuous path is formed across the volume of the sample for electrons to travel. For example, at low filler loading, the composition's conductivity can be close to the pure polymer phase. Further, combining a non-conductive polymer with a conductive agent, such as conductive carbon black, can delay the movement of electrons or electron hopping, which can give a broader percolation curve slope.

As noted above, the disclosed compositions exhibit a relatively robust percolation curve, i.e., a relatively flat percolation curve enabling the manufacture of electrostatic dissipative composites with various filler compositions while still maintaining a surface resistivity in the desired range of from about $10^6$ ohm/sq to $10^9$ ohm/sq.

The disclosed compositions can exhibit a relatively robust percolation curve by measuring the tolerance level. Measuring the tolerance level acts as an alternative method of illustrating the robustness of the percolation curve. As such, all the compositions disclosed above can be measured by the tolerance level and are included herein.

To measure the tolerance level:

$$\text{Tolerance level} = \frac{\left(\begin{array}{c}\text{Volume \% filler at } 10^9 \text{ ohm/sq} - \\ \text{Volume \% filler at } 10^6 \text{ ohm/sq}\end{array}\right)}{2}$$

The smaller the value for the tolerance level, the more narrow the tolerance. As noted above, if the tolerance is narrow, then small variations in the concentration and/or loading of the conductive filler can result in substantial, and potentially undesirable, changes in the material's electrostatic dissipative properties. The greater the value for the tolerance level, the more robust, i.e. flat, the percolation curve.

In at least one aspect, the composition exhibits a tolerance level greater than ±0.37. In another aspect, the composition exhibits a tolerance level in the range of from ±0.37 to ±1.0, including exemplary values, ±0.40, ±0.45, ±0.50, ±0.55, ±0.60, ±0.65, ±0.70, ±0.75, ±0.80, ±0.85, ±0.90, and ±0.95. In still further aspect, the tolerance level can be in a range derived from any two of the exemplary tolerance level values. For example, the composition can exhibit a tolerance level in the range of from ±0.40 to ±0.95.

II. Methods of Manufacture

The disclosed compositions comprising the above-described components can be manufactured according to any conventionally known methods of preparing conventional carbon fiber based electrostatic dissipative composites. For example, a filler composition and a thermoplastic polymer resin can be combined to provide a composition mixture wherein the filler composition is at least substantially dispersed within the thermoplastic polymer resin phase. The fibers and the resin can be combined, for example, by using conventional extrusion techniques.

As described herein, the present invention relates to blended composites. The blended composites of the present disclosure can be formed using any known method of combining multiple components to form a thermoplastic resin. In one aspect, the components are first blended in a high-speed mixer. Other low shear processes including but not limited to hand mixing can also accomplish this blending. The blend is then fed into the throat of a twin-screw extruder via a hopper. Alternatively, one or more of the components can be incorporated into the composition by feeding directly into the extruder at the throat and/or downstream through a sidestuffer. The extruder is generally operated at a temperature higher than that necessary to cause the composition to flow. The extrudate is immediately quenched in a water batch and pelletized. The pellets so prepared when cutting the extrudate can be one-fourth inch long or less as desired. Such pellets can be used for subsequent molding, shaping, or forming. In one aspect, the blend composition is formed by extrusion blending.

According to various aspects, methods for manufacturing the present composites generally comprise providing a thermoplastic polymer or polymer composition as described herein; providing a filler composition comprising a conductive carbon black; and a non-conductive polymer; and combining the provided polymer composition and provided filler composition to provide a resulting composition.

In an exemplary aspect, disclosed is a method for the manufacture of an electrostatic dissipative composite comprising the steps of: a) providing a thermoplastic polymer composition; b) providing a filler composition, comprising i) a conductive carbon black; and ii) a non-conductive polymer; c) combining the filler composition and the thermoplastic resin to provide a composite, wherein the filler composition is present in the provided composite in a volume percentage loading in the range of from 7.4 to 10.5 relative to a total volume of the composite; and wherein the provided composite exhibits a surface resistivity in the range of from $10^6$ ohm/sq to $10^9$ ohm/sq.

In another aspect, disclosed is a method for the manufacture of an electrostatic dissipative composite comprising the steps of: a) providing a crystalline thermoplastic polymer composition; b) providing a filler composition, comprising i) a conductive carbon black; and ii) a non-conductive polymer; c) combining the filler composition and the thermoplastic polymer composition to provide a composite, wherein the filler composition is present in the provided composite in a volume percentage loading in the range of from 5.0 to 6.0 relative to a total volume of the composite; and wherein the provided composite exhibits a surface resistivity in the range of from $10^6$ ohm/sq to $10^9$ ohm/sq.

In yet another aspect, disclosed is a method for the manufacture of an electrostatic dissipative composite comprising the steps of: a) providing a thermoplastic polymer composition; b) providing a filler composition comprising i) a conductive carbon black; and ii) a non-conductive polymer; c) combining the filler composition and the thermoplastic polymer composition to provide a composite; wherein the provided composite exhibits a tolerance level in the range of from ±0.37 to ±1.0.

III. Articles of Manufacture

Shaped, formed, or molded articles including the composites are also provided. The composites can be molded into useful shaped articles by a variety of means such as injection molding, extrusion, rotational molding, blow molding and thermoforming to form articles such as, for example, personal computers, notebook and portable computers, cell phone antennas and other such communications equipment, medical applications, RFID applications, automotive applications, and the like.

In a further aspect, the method comprises forming a molded part from the formed blend composition.

In various aspects, the composition can be used in the field of electronics. In a further aspect, non-limiting examples of fields include electrical, electro-mechanical, Radio Frequency (RF) technology, telecommunication, automotive, aviation, medical, sensor, military, and security. In a still further aspect, the use of the composition can also be present in overlapping fields, for example in mechatronic systems that integrate mechanical and electrical properties which can, for example, be used in automotive or medical engineering.

In one aspect, molded articles according to the present invention can be used to produce a device in one or more of the foregoing fields. In a still further aspect, non-limiting examples of such devices in these fields which can use the composition according to the present invention include computer devices, household appliances, decoration devices, electromagnetic interference devices, printed circuits, Wi-Fi devices, Bluetooth devices, GPS devices, cellular antenna devices, smart phone devices, automotive devices, military devices, aerospace devices, medical devices, such as hearing aids, sensor devices, security devices, shielding devices, RF antenna devices, or RFID devices.

In a still further aspect, the molded articles can be used to manufacture devices in the automotive field. In a further aspect, non-limiting examples of such devices in the automotive field in the vehicle's interior include adaptive cruise control, headlight sensors, windshield wiper sensors, and door/window switches. In a further aspect, non-limiting examples of devices in the automotive field in the vehicle's exterior include pressure and flow sensors for engine management, air conditioning, crash detection, and exterior lighting fixtures.

Plastic plating was developed for industrial application because of the low cost, the ability to mold large and complex parts, and the reduction of weight. Plastic plating also allows the rapid development of new designs and reduced space requirements in both production and the devices themselves. As gasoline prices rise, consumers have become more interested in automotive weight reduction. Non-limiting examples of plastic materials which can be plated include acrylonitrile butadiene styrene (ABS), polypropylene, polysulfone, polyethersulfone, polyetherimide, Teflon, polyarylether, polycarbonate, polyphenylene oxide, polyacetel.

Still further, the resulting composition mixture can be used to provide any desired shaped, formed, or molded articles. For example, the composition mixture can be molded into useful shaped articles by a variety of means such as injection molding, extrusion, rotational molding, blow molding and thermoforming. As noted above, the disclosed compositions are particularly well suited for use in the manufacture of electronic components and devices. As such, according to some aspects, the disclosed compositions can be used to form articles such as printed circuit board carriers, burn in test sockets, flex brackets for hard disk drives, and the like.

The disclosed composites and method of making include at least the following aspects.

Aspect 1: An electrostatic dissipative composite, comprising
   a) a continuous thermoplastic polymer phase; and
   b) at least one dispersed filler phase comprised of a filler composition, comprising
      i. a conductive carbon black; and
      ii. a non-conductive polymer;
   wherein the filler composition is present in a volume percentage loading in the range of from 7.4 to 10.5 relative to a total volume of the composite; and
   wherein the composite exhibits a surface resistivity in the range of from $10^6$ ohm/sq to $10^9$ ohm/sq Aspect 2: The electrostatic dissipative composite of aspect 1, wherein the continuous thermoplastic polymer phase comprises at least one polycarbonate.

Aspect 3: The electrostatic dissipative composite of any of aspects 1-2, wherein at least one polycarbonate is a bisphenol A polycarbonate.

Aspect 4: The electrostatic dissipative composite of any of aspects 1-3, wherein at least one non-conductive polymer is selected from the group consisting of styrene-acrylonitrile copolymer and ultra-high molecular weight polyethylene.

Aspect 5: The electrostatic dissipative composite of any of aspects 1-4, wherein the ultra-high molecular weight polyethylene is MIPELON XM 221U.

Aspect 6: The electrostatic dissipative composite of any of aspects 1-5, wherein the styrene-acrylonitrile copolymer is a styrene-acrylonitrile copolymer encapsulated polytetrafluoroethylene.

Aspect 7: The electrostatic dissipative composite of any of aspects 1-6, wherein the conductive carbon black is ENSACO 250G.

Aspect 8: The electrostatic dissipative composite of any of aspects 1-7, the non-conductive polymer is present in an amount in the range of from 15 to 25 weight % relative to the total filler loading.

Aspect 9: An electrostatic dissipative composite, comprising
- a) a crystalline continuous thermoplastic polymer phase; and
- b) at least one dispersed filler phase comprised of a filler composition, comprising
  - i. a conductive carbon black; and
  - ii. a non-conductive polymer;
- wherein the filler composition is present in a volume percentage loading in the range of from 5.0 to 6.0 relative to a total volume of the composite; and
- wherein the composite exhibits a surface resistivity in the range of from $10^6$ ohm/sq to $10^9$ ohm/sq.

Aspect 10: The electrostatic dissipative composite of aspect 9, wherein the continuous thermoplastic polymer phase comprises polybutylene terephthalate.

Aspect 11: The electrostatic dissipative composite of any of aspects 9-10, wherein the conductive carbon black is ENSACO 250 G and the at least one non-conductive polymer is MIPELON XM 221 U.

Aspect 12: The electrostatic dissipative composite of any of aspects 9-11, wherein the total amount of non-conductive polymer ranges from 15 to 25 weight % of the total filler loading.

Aspect 13: An electrostatic dissipative composite, comprising
- a) a continuous thermoplastic polymer phase; and
- b) at least one dispersed filler phase comprised of a filler composition, comprising
  - i. a conductive carbon black; and
  - ii. a non-conductive polymer;
- wherein the composite exhibits a tolerance level in the range of from ±0.37 to ±1.0.

Aspect 14: The electrostatic dissipative composite of aspect 13, wherein the continuous thermoplastic polymer phase comprises at least one polymer selected from the group consisting of polycarbonate and polybutylene terephthalate.

Aspect 15: The electrostatic dissipative composite of any of aspects 13-14, wherein at least one polycarbonate is selected from the group consisting of polycarbonate 105 or polycarbonate 175.

Aspect 16: The electrostatic dissipative composite of any of aspects 13-15, wherein at least one non-conductive polymer is selected from the group consisting of styrene-acrylonitrile copolymer and ultra-high molecular weight polyethylene.

Aspect 17: The electrostatic dissipative composite of any of aspects 13-16, wherein the ultra-high molecular weight polyethylene is MIPELON XM 221U.

Aspect 18: The electrostatic dissipative composite of any of aspects 13-17, wherein the styrene-acrylonitrile copolymer is a styrene-acrylonitrile copolymer encapsulated polytetrafluoroethylene.

Aspect 19: The electrostatic dissipative composite of any of aspects 13-18, wherein the conductive carbon black is ENSACO 250G.

Aspect 20: The electrostatic dissipative composite of any of aspects 13-19, wherein the total amount of non-conductive polymer ranges from 15 to 25 weight % of the total filler loading.

Aspect 21: An electrostatic dissipative composite, comprising
- a) a continuous thermoplastic polymer phase comprising at least one bisphenol A polycarbonate; and
- b) at least one dispersed filler phase comprised of a filler composition, comprising
  - i. ENSACO 250G conductive carbon black; and
  - ii. at least one non-conductive polymer selected from the group consisting of styrene-acrylonitrile copolymer encapsulated polytetrafluoroethylene and MIPELON XM 221U ultra-high molecular weight polyethylene;
- wherein the filler composition is present in a volume percentage loading in the range of from 7.4 to 10.5 relative to a total volume of the composite;
- wherein the non-conductive polymer is present in an amount in the range of from 15 to 25 weight % relative to the total filler loading; and
- wherein the composite exhibits a surface resistivity in the range of from $10^6$ ohm/sq to $10^9$ ohm/sq.

Aspect 22: An electrostatic dissipative composite, comprising
- a) a crystalline continuous thermoplastic polymer phase comprising polybutylene terephthalate; and
- b) at least one dispersed filler phase comprised of a filler composition, comprising
  - i. ENSACO 250G conductive carbon black; and
  - ii. MIPELON XM 221U ultra-high molecular weight polyethylene;
- wherein the filler composition is present in a volume percentage loading in the range of from 5.0 to 6.0 relative to a total volume of the composite;
- wherein the non-conductive polymer is present in an amount in the range of from 15 to 25 weight % relative to the total filler loading; and
- wherein the composition exhibits a surface resistivity in the range of from $10^6$ ohm/sq to $10^9$ ohm/sq.

Aspect 23: An electrostatic dissipative composite, comprising
- a) a continuous thermoplastic polymer phase comprising at least one polymer selected from the group consisting of polybutylene terephthalate and polycarbonate; and
- b) at least one dispersed filler phase comprised of a filler composition, comprising
  - i. ENSACO 250G conductive carbon black; and
  - ii. at least one non-conductive polymer selected from the group consisting of styrene-acrylonitrile copolymer encapsulated polytetrafluoroethylene and MIPELON XM 221U ultra-high molecular weight polyethylene;
- wherein the non-conductive polymer is present in an amount in the range of from 15 to 25 weight % relative to a total filler loading; and
- wherein the composite exhibits a tolerance level in the range of from ±0.37 to ±1.0.

Aspect 24: A method for the manufacture of an electrostatic dissipative composite, comprising the steps of:
- a) providing a thermoplastic polymer composition;
- b) providing a filler composition, comprising
  - i. a conductive carbon black; and
  - ii. a non-conductive polymer;
- c) combining the filler composition and the thermoplastic resin to provide a composite, wherein the filler composition is present in the provided composite in a volume percentage loading in the range of from 7.4 to 10.5 relative to a total volume of the composite; and wherein the provided composite exhibits a surface resistivity in the range of from $10^6$ ohm/sq to $10^9$ ohm/sq.

Aspect 25: the method of aspect 24, wherein the thermoplastic polymer composition comprises at least one polycarbonate.

Aspect 26: The method of aspect 24 or 25, wherein at least one polycarbonate is a bisphenol A polycarbonate.

Aspect 27: The method of any of aspects 24-26, wherein the non-conductive polymer is selected from the group consisting of styrene-acrylonitrile copolymer and ultra-high molecular weight polyethylene.

Aspect 28: The method of any of aspects 24-27, wherein the ultra-high molecular weight polyethylene is MIPELON XM 221U.

Aspect 29: The method of any of aspects 24-28, wherein the styrene-acrylonitrile copolymer is a styrene-acrylonitrile copolymer encapsulated polytetrafluoroethylene.

Aspect 30: The method of any of aspects 24-29, wherein the conductive carbon black is ENSACO 250G.

Aspect 31: The method of any of aspects 24-30, wherein the non-conductive polymer is present in the provided composite in an amount in the range of from 15 to 25 weight % relative to the total filler loading.

Aspect 32: A method for the manufacture of an electrostatic dissipative composite, comprising the steps of:
a) providing a crystalline thermoplastic polymer composition;
b) providing a filler composition, comprising
i. a conductive carbon black; and
ii. a non-conductive polymer;
c) combining the filler composition and the thermoplastic polymer composition to provide a composite,
wherein the filler composition is present in the provided composite in a volume percentage loading in the range of from 5.0 to 6.0 relative to a total volume of the composite; and wherein the provided composite exhibits a surface resistivity in the range of from $10^6$ ohm/sq to $10^9$ ohm/sq.

Aspect 33: The method of aspect 32, wherein the continuous thermoplastic polymer composition comprises polybutylene terephthalate.

Aspect 34: The method of aspect 32 or 33, wherein the conductive carbon black is ENSACO 250 G and the at least one non-conductive polymer is MIPELON XM 221 U.

Aspect 35: The method of any of aspects 32-34, wherein the total amount of non-conductive polymer ranges from 15 to 25 weight % of the total filler loading.

Aspect 36: A method for the manufacture of an electrostatic dissipative composite, comprising the steps of:
a) providing a thermoplastic polymer composition;
b) providing a filler composition comprising
i. a conductive carbon black; and
ii. a non-conductive polymer;
c) combining the filler composition and the thermoplastic polymer composition to provide a composite;
wherein the provided composite exhibits a tolerance level in the range of from ±0.37 to ±1.0.

Aspect 37: The method of aspect 36, wherein the thermoplastic polymer composition comprises at least one polymer selected from the group consisting of polycarbonate and polybutylene terephthalate.

Aspect 38: The method of aspect 36 or 37, wherein at least one polycarbonate is a bisphenol A polycarbonate.

Aspect 39: The method of any of aspects 36-38, wherein at least one non-conductive polymer is selected from the group consisting of styrene-acrylonitrile copolymer and ultra-high molecular weight polyethylene.

Aspect 40: The method of any of aspects 36-39, wherein the ultra-high molecular weight polyethylene is MIPELON XM 221U.

Aspect 41: The method of any of aspects 36-40, wherein the styrene-acrylonitrile copolymer is a styrene-acrylonitrile copolymer encapsulated polytetrafluoroethylene.

Aspect 42: The method of any of aspects 36-41, wherein the conductive carbon black is ENSACO 250G.

Aspect 43: The method of any of aspects 36-42, wherein the amount of non-conductive polymer present in the provided filler composition is in the range of from 15 to 25 weight % of the total filler loading.

EXAMPLES

The following examples are put forth so as to provide those of ordinary skill in the art with a complete disclosure and description of how the electrostatic dissipative composites disclosed and claimed herein can be made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in C or is at ambient temperature, and pressure is at or near atmospheric.

Example 1

In the following example, electrostatic dissipative composites of the present invention were manufactured and compared to a conventional or control composition for surface resistivity behavior. More specifically, the filler composition was prepared using four different non-conductive polymers and combined with the conductive carbon black. The filler compositions were dispersed in a polycarbonate base thermoplastic resin phase and evaluated for percolation curve behavior at four different volume percent filler loading. The polycarbonate base thermoplastic resin phase included polycarbonate 105 and polycarbonate 175. The four different non-conductive polymers included three non-conductive UHMWPE. The three grades of UHMWPE evaluated were as follows: (1) UHMWPE I (MIPELON™ XM 221U), (2) UHMWPE II (GUR™ 2126), and (3) UHMWPE III (SABIC™ 3548). The last non-conductive polymer evaluated was styrene-acrylonitrile copolymer encapsulated PTFE (TSAN). These four different non-conductive polymers were combined with conductive carbon black, ENSACO™ 250G, to prepare the filler composition. The non-conductive polymer, as the total amount of non-conductive filler, was about 20 weight % of the total filler loading. Each of the filler compositions was analyzed for its surface resistivity as characterized by its percolation curve behavior at various loading percentages of about 6 volume percent, about 7.5 volume percent, about 9 volume percent, and about 10.5 volume percent.

The above compositions were compounded in a ZSK 40 mm twin screw extruder whereby the polycarbonate resin was added at the feed throat and the filler composition was fed downstream. The barrel temperature ranged from 240° C. to 290° C. Test parts were then injection molded with barrel temperatures set to 250° C. to 300° C. and mold temperature set to 100° C.

Figure 2:
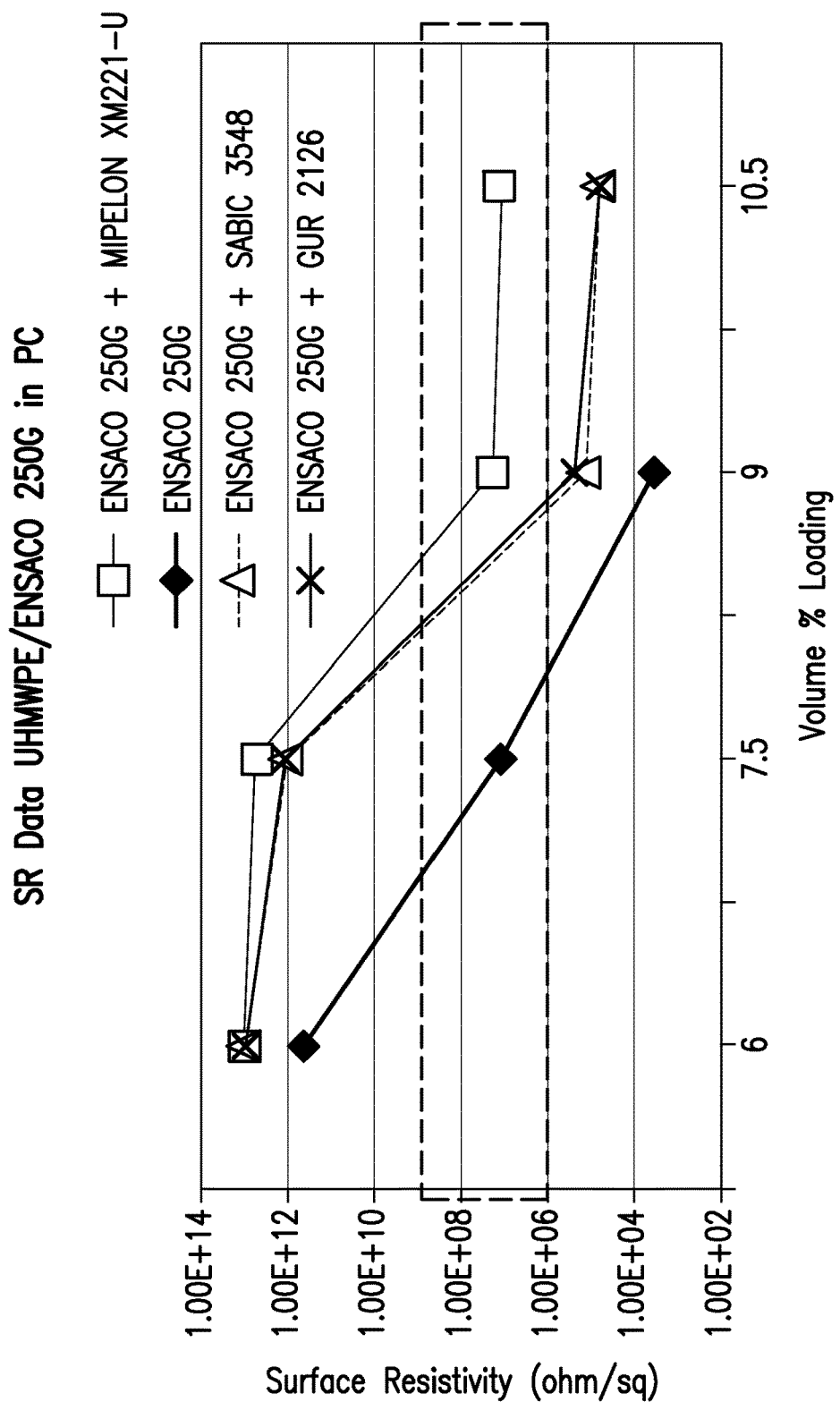
FIG. 2 is a graph illustration of surface resistivity percolation curves for several inventive and comparative compositions described in the examples using conductive carbon black alone as a filler composition or in combination with each of three different grades of ultra-high molecular weight polyethylene (UHMWPE) in a composition comprising polycarbonate.

FIG. 2 shows the electrical percolation curves generated from analysis of the above-described polycarbonate compositions with the control and three different filler compositions at various loading percentages. As shown, the surface resistivity graph of the filler composition with conductive carbon black (CCB) (ENSACO 250G) exhibited a relatively steep transition during the network formulation and within the desired surface resistivity range of $10^6$ ohm/sq to $10^9$ ohm/sq. However, in contrast, relatively flat transition behavior within the desired surface resistivity range of $10^6$ ohm/sq to $10^9$ ohm/sq was observed with the conductive carbon black (ENSACO 250 G) combined with UHMWPE I (MIPELON™ XM 221U), UHMWPE II (GUR™ 2126), and UHMWPE III (SABIC™ 3548). To that end, a number of data points were observed within the ESD range of $10^6$ ohm/sq to $10^9$ ohm/sq. Therefore, it could be seen that an ESD material designed with these exemplary filler compositions at, for example, an 8 volume percent loading of the filler composition, slight variation in the filler composition loading during the processing (extrusion/molding) will not affect the ESD performance of the material. In other words, it is now possible to design robust ESD safe materials with these filler compositions. It is noted that the CCB graph line and the CCB and the UHMWPE III graph line follow a similar trend, such that the lines almost overlap.

Figure 3:
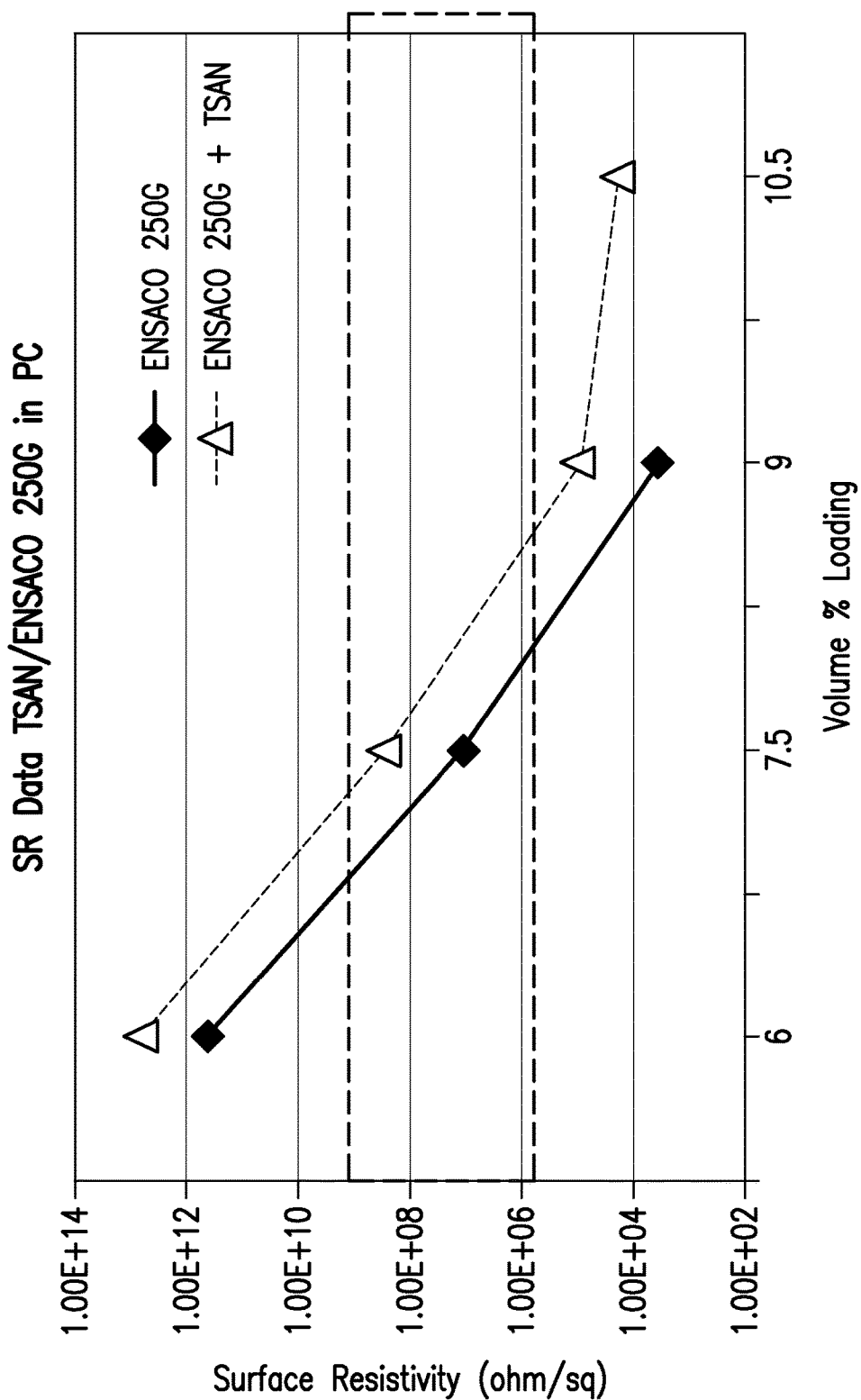
FIG. 3 is a graph illustration of surface resistivity percolation curves for an inventive and a comparative composition described in the examples using conductive carbon black alone or in combination with styrene-acrylonitrile copolymer encapsulated polytetrafluoroethylene (TSAN).

Similarly, FIG. 3 shows the electrical percolation curves generated from analysis of the above-described polycarbonate compositions with the control and one other filler composition at various loading percentages. As shown, the surface resistivity graph of the filler composition with conductive carbon black (ENSACO 250G) exhibited a relatively steep transition during the network formulation and within the desired surface resistivity range of $10^6$ ohm/sq to $10^9$ ohm/sq. However, in contrast, relatively flat transition behavior within the desired surface resistivity range of $10^6$ ohm/sq to $10^9$ ohm/sq was observed with the conductive carbon black (ENSACO 250G) combined with styrene-acrylonitrile copolymer encapsulated PTFE (TSAN). To that end, a number of data points were observed within the ESD range of $10^6$ ohm/sq to $10^9$ ohm/sq. Again, it could be seen that an ESD material designed with these exemplary filler compositions at, for example, an 8 volume percent loading of the filler composition, slight variation in the filler composition loading during the processing (extrusion/molding) will not affect the ESD performance of the material.

Quantitatively demonstrating the steep or flat transition behavior, the tolerance level was calculated from the electrical percolation curves generated from the analysis of the above-described polycarbonate compositions with the control and the four different filler compositions. The tolerance level can quantitatively demonstrate the transition behavior's steepness because the smaller the tolerance level's absolute value, then the steeper the transition during the network formulation within the desired surface resistivity range of $10^6$ ohm/sq to $10^9$ ohm/sq. Table 1 below shows the tolerance level in volume % the control and various filler loading in the polycarbonate based resin within the desired surface resistivity range of $10^6$ ohm/sq to $10^9$ ohm/sq.

TABLE 1

| Filler | Tolerance level in volume % of filler loading in composition |
|---|---|
| Conductive carbon black (ENSACO 250G) | ±0.4 |
| UHMWPE I (MIPELON XM 221U) | ±1.0 |
| UHMWPE II (GUR 2126) | ±0.3 |
| UHMWPE III (SABIC 3548) | ±0.3 |
| Styrene-acrylonitrile copolymer encapsulated PTFE (TSAN) | ±0.5 |

As the data of Table 1 illustrated, the compositions with the filler composition loading of UHMWPE I (MIPELON XM 221U) and styrene-acrylonitrile copolymer encapsulated PTFE (TSAN) generally exhibited a greater absolute value for the tolerance level. Therefore, UHMWPE I (MIPELON XM 221U) and styrene-acrylonitrile copolymer encapsulated PTFE (TSAN) quantitatively demonstrated a flatter transition behavior than the transition behavior of the filler without the non-conductive polymer.

Example 2

In the following example, electrostatic dissipative composites of the present invention were manufactured and compared to a conventional or control series of compositions for surface resistivity behavior. More specifically, the filler composition was prepared using a different non-conductive polymer and combined with the conductive carbon black. The filler composition was dispersed in a polybutylene terephthalate (PBT) base thermoplastic resin phase and evaluated for percolation curve behavior at four different volume percent filler loading. UHMWPE I (MIPELON™ XM 221U) was evaluated and was combined with conductive carbon black (ENSACO™ 250G) to prepare the filler composition. The non-conductive polymer, as the total amount of non-conductive filler, was about 20 weight % of the total filler loading. Each of the filler compositions was analyzed for its surface resistivity as characterized by its percolation curve behavior at various loading percentages of about 3 volume percent, about 4.5 volume percent, about 6 volume percent, and about 7.5 volume percent.

The above compositions were compounded in a ZSK 40 mm twin screw extruder whereby the polycarbonate resin was added at the feed throat and the filler composition was fed downstream. The barrel temperature ranged from 240° C. to 290° C. Test parts were then injection molded with barrel temperatures set to 250° C. to 300° C. and mold temperature set to 100° C.

Figure 4:
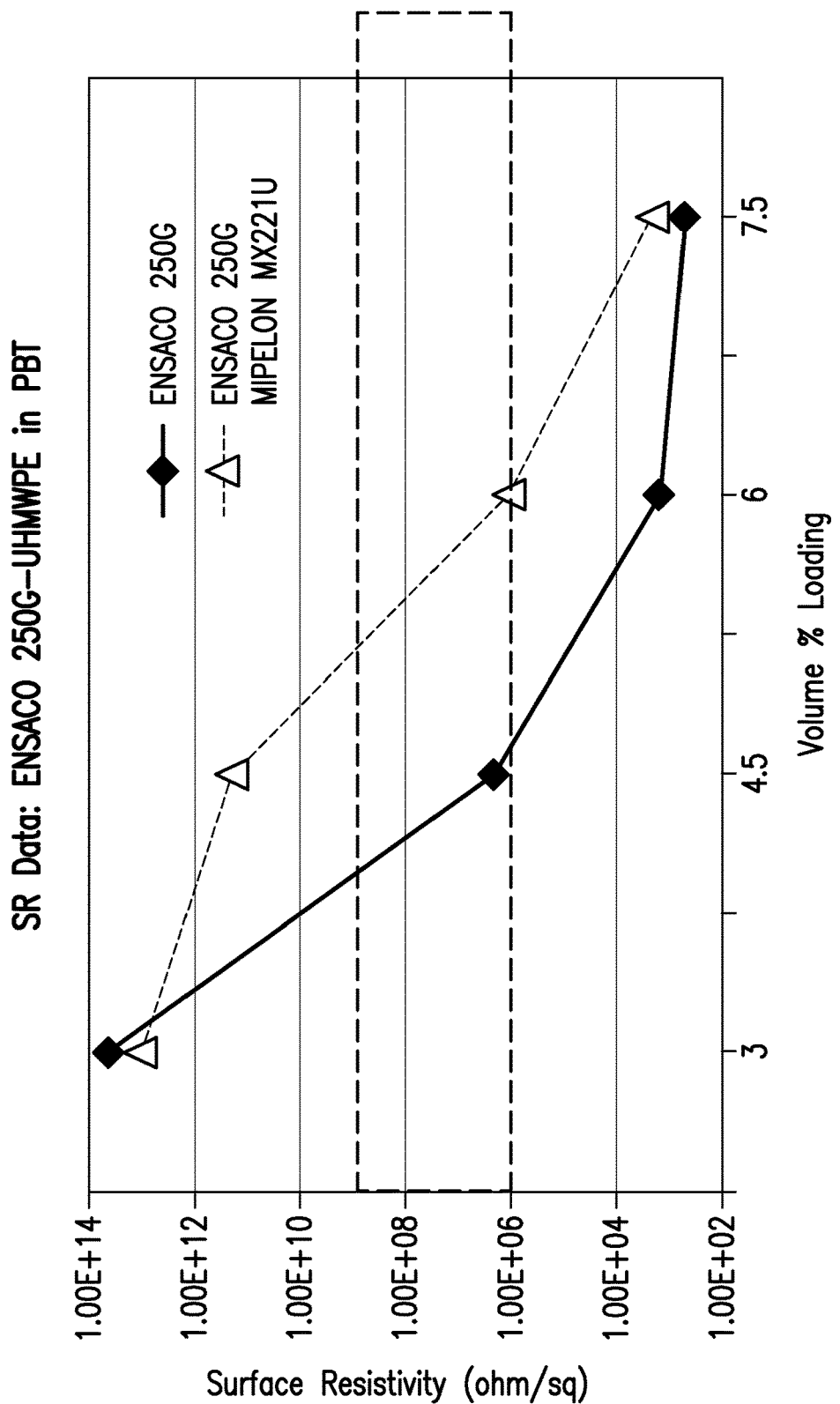
FIG. 4 is a graph illustration of surface resistivity percolation curves for an inventive and a comparative composition described in the examples using conductive carbon black alone or in combination with a UHMWPE in a composition comprising polybutylene terephthalate (PBT).

FIG. 4 shows the electrical percolation curves generated from analysis of the above-described PBT compositions with the control and a different filler composition at various loading percentages. As shown, the surface resistivity graph of the filler composition with conductive carbon black (ENSACO™ 250G) exhibited a relatively steep transition during the network formulation and within the desired surface resistivity range of $10^6$ ohm/sq to $10^9$ ohm/sq. However, in contrast, relatively flat transition behavior within the desired surface resistivity range of $10^6$ ohm/sq to $10^9$ ohm/sq was observed with the conductive carbon black (ENSACO™ 250G) combined with UHMWPE I (MIPELON™ XM 221U). To that end, a number of data points were observed within the ESD range of $10^6$ ohm/sq to $10^9$ ohm/sq. Therefore, it could be seen that an ESD material designed with these exemplary filler compositions at, for example, an 5.5 volume percent loading of the filler composition, slight variation in the filler composition loading during the processing (extrusion/molding) will not affect the ESD performance of the material. In other words, it is now possible to design robust ESD safe materials with these filler compositions.

Similarly, the tolerance level quantitatively demonstrated the transition behavior's steepness because the smaller the tolerance level's absolute value, then the steeper the transition during the network formulation within the desired surface resistivity range of $10^6$ ohm/sq to $10^9$ ohm/sq. Table 2 below shows the tolerance level in volume % the control and various filler loading in the PBT based resin within the desired surface resistivity range of $10^6$ ohm/sq to $10^9$ ohm/sq.

TABLE 2

| Filler | Tolerance level in volume % of filler loading in composition |
|---|---|
| Conductive carbon black (ENSACO™ 250G) | ±0.37 |
| UHMWPE I (MIPELON™ XM 221U) | ±0.48 |

As the data of Table 2 illustrated, the composition with the filler composition loading including the non-conductive polymer, UHMWPE I (MIPELON™ XM 221U), generally exhibited a greater absolute value for the tolerance level when compared to a filler composition without the non-conductive polymer. Therefore, a filler composition including UHMWPE I (MIPELON™ XM 221U) quantitatively demonstrated a flatter transition behavior than the transition behavior of the filler without the non-conductive polymer.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An electrostatic dissipative composite, comprising
   (a) a continuous thermoplastic polymer phase; and
   (b) at least one dispersed filler phase comprised of a filler composition, comprising
      (i) a conductive carbon black; and
      (ii) a non-conductive polymer wherein at least one non-conductive polymer is selected from the group consisting of one of a styrene-acrylonitrile copolymer and an ultra-high molecular weight polymer and mixtures thereof;
   wherein the composite exhibits a surface resistivity in the range of from $10^6$ ohm/sq to $10^9$ ohm/sq;
   wherein the composite exhibits a tolerance level in the range of from ±0.37 to ±1.0.

2. The electrostatic dissipative composite of claim 1, wherein the continuous thermoplastic polymer phase comprises at least one polymer selected from the group consisting of polycarbonate and polybutylene terephthalate.

3. The electrostatic dissipative composite of claim 2, wherein at least one polycarbonate is a bisphenol A polycarbonate.

4. The electrostatic dissipative composite of claim 1, wherein the ultra-high molecular weight polymer is an ultra-high molecular weight polyethylene polymer.

5. The electrostatic dissipative composite of claim 1, wherein the styrene-acrylonitrile copolymer is a styrene-acrylonitrile copolymer encapsulated polytetrafluoroethylene.

6. The electrostatic dissipative composite of claim 1, wherein the total amount of non-conductive polymer ranges from 15 to 25 weight % of the total filler loading.

7. An electrostatic dissipative composite, comprising
   (a) a continuous thermoplastic polymer phase comprising at least one polymer selected from the group consisting of polybutylene terephthalate and polycarbonate; and
   (b) at least one dispersed filler phase comprised of a filler composition, comprising
      (i) a conductive carbon black; and
      (ii) at least one non-conductive polymer selected from one of the group consisting of styrene-acrylonitrile copolymer encapsulated polytetrafluoroethylene and ultra-high molecular weight polyethylene polymer;
   wherein the non-conductive polymer is present in an amount in the range of from 15 to 25 weight % relative to a total filler loading; and
   wherein the composite exhibits a tolerance level in the range of from ±0.37 to ±1.0.

* * * * *